United States Patent Office 3,050,007
Patented Aug. 21, 1962

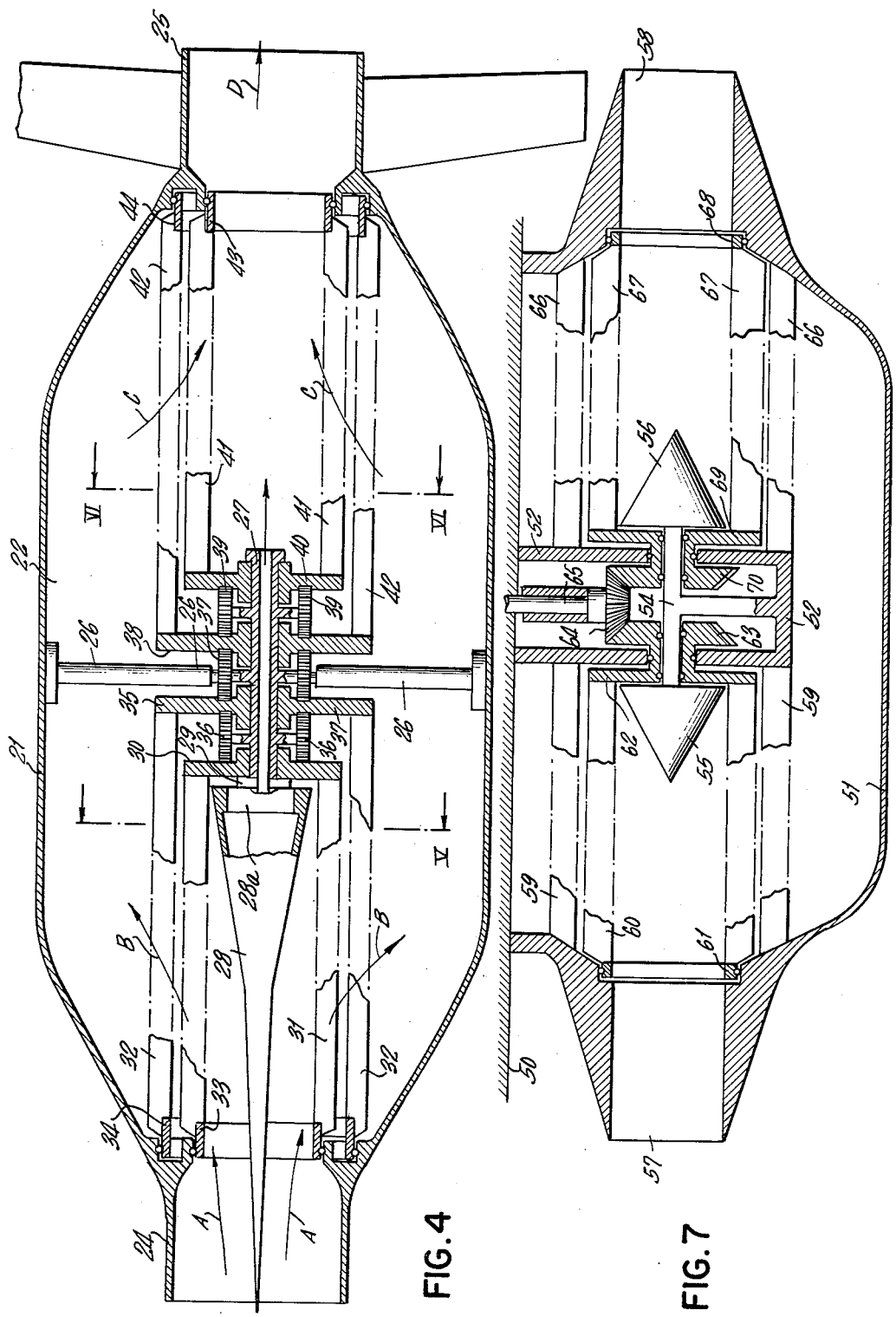

3,050,007
PROPELLER APPARATUS
Leon Rydz, 137 Webster Ave., Yonkers, N.Y.
Filed Apr. 27, 1959, Ser. No. 808,987
14 Claims. (Cl. 103—94)

My invention relates generally to propellers and similar apparatus such as for the propulsion of vessels, missiles and aircraft, for impelling fluid in blowers, pumps and compressors, or for use as motor, turbine or hydraulic actuator.

It is an object of my invention to improve such apparatus toward increased efficacy for given space requirements, and it is also an object to achieve such improvement by means of a relatively simple design.

To this end, as well as for attaining the more specific objects apparent from the following, I provide a pair of concentric blade groups of which one is coaxially rotatable relative to the other, each group forming a cage structure of axially elongated blade members peripherally spaced from each other and extending longitudinally of the cage structure, preferably along respective helical curves. One of the blade groups may be fixed and the other rotatable, or both groups may be rotatable in mutually opposed directions. Furthermore, the individual blade members of each rotatable group are given a transverse cross section composed of a leading-edge portion and a trailing portion rigidly integral with each other, with the leading portion extending generally in concentric relation to the axis of rotation whereas the trailing portion of the cross section deviates from a concentric circle either inwardly or outwardly depending upon the delivering direction of the apparatus, as will be more fully explained below. When providing helical blade members, those of one group are given a sense of pitch opposed to that of the helical blades in the other group, thus avoiding or minimizing the occurrence of impact or intermittent stresses during operation.

According to another feature of the invention, I provide a propeller apparatus as described above, with duct means to serve as fluid inlet or outlet directly and coaxially adjacent to the two blade groups or cage structures.

According to still another feature of my invention, I provide an assembly of two axially aligned propeller units with an inlet duct and an outlet duct located at opposite axial ends of the assembly, each unit comprising a pair of concentric blade groups as described above, with the trailing portions of all rotating blades in one unit slanting outwardly and those in the other unit slanting inwardly so that the fluid medium in one unit passes axially through the inlet duct and circumferentially out of the two adjacent blade groups, whereas in the other unit the fluid enters circumferentially between the blades and passes axially out of the outlet duct.

According to still another feature, the two units of the assembly have a common housing which encloses, and forms a fluid passage between, the outer peripheral environments of the two units.

According to another, more specific feature, the two units of the assembly have a common drive comprising a transmission located between the units and drivingly connected with the two blade groups of each unit to rotate them in mutually opposed directions.

The foregoing and more specific objects and features of my invention will be apparent from or described in, the following with reference to the embodiments of propulsion devices illustrated by way of example on the accompanying drawings in which FIG. 1 shows schematically a ship propulsion device, partly in longitudinal section.

FIG. 4 shows schematically a longitudinal section of a missile or aircraft propulsion system.

FIG. 7 is a schematic lateral view, in section, of a propulsion drive for a boat.

Figure 1:
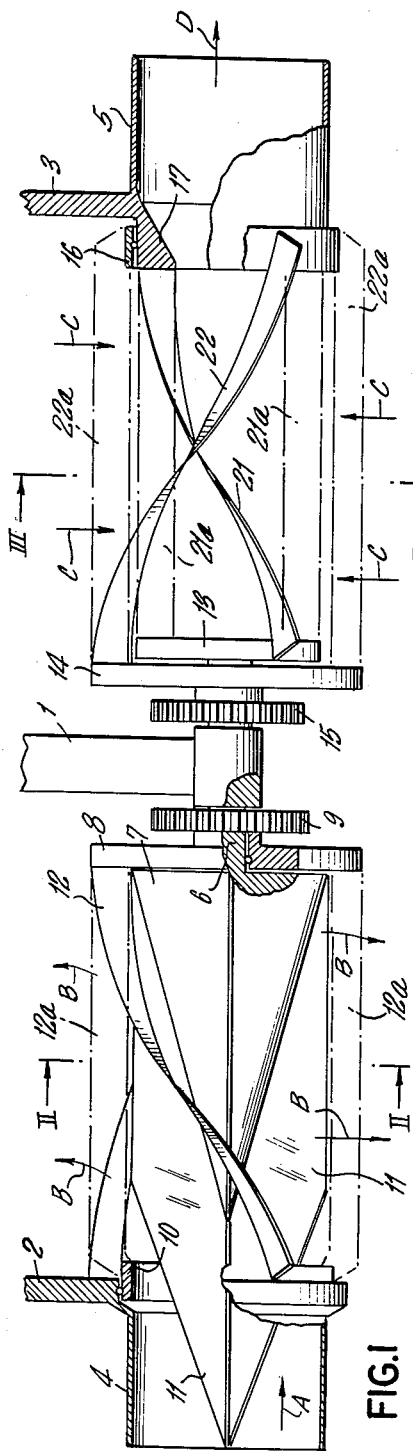

Referring to FIG. 1, there is illustrated a ship propulsion system which is secured to the hull of the vessel by means of rigid connecting structures 1, 2 and 3, hereinafter referred to as "fixed" structures. Structure 2 is located in front. Structure 3 is at the rear of the vessel. An inlet duct 4 is rigidly attached to the forward structure 2. A similar duct 5 serving as an outlet for impelled water is rigidly attached to the rear structure 3.

Firmly joined with the middle structure 1 is a rigid hub portion 6 to which a cone member 7 is attached. It will be understood that hub 6 and cone 7 remain stationary during the operation of the propulsion system relative to the fixed structures 1, 2, 3. A ring member 8 is rotatably seated on hub 6, preferably by means of anti-friction bearings, and is rigidly joined with a coaxial spur gear 9 which, during operation of the system, is geared to the propulsion engine of the vessel in any suitable manner. Another coaxial ring 10 is rotatably mounted on the fixed structure 2, preferably by means of anti-friction bearings.

Figure 2:
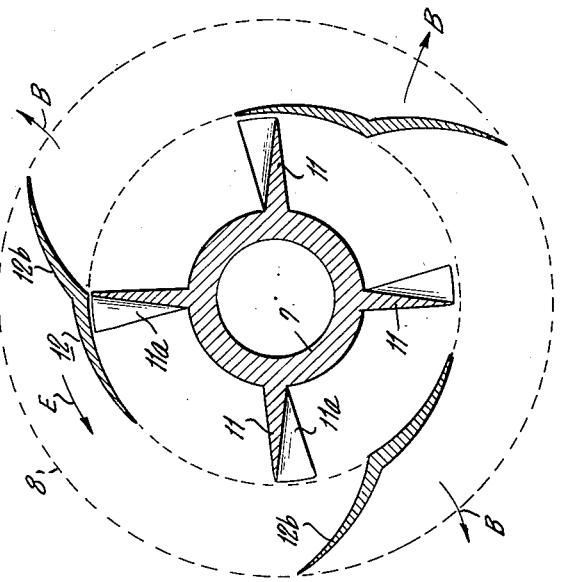
FIG. 2 is a cross section along the radial plane identified in FIG. 1 by the line II—II

A group of fixed blades 11 is mounted on, or integral with, the conical member 7, the blades being uniformly distributed about the periphery of the cone and preferably somewhat skewed, for example, by an angle of about 20°, as is apparent from the fact that the somewhat helical side faces 11a of the respective blades 11 are visible in the cross-sectional illustration of FIG. 2. The group of fixed blades 11 is surrounded by a coaxial group of movable blades 12 of elongated shape whose ends are firmly mounted on the respective rings 8 and 10. Thus, the movable blades together with the rings form a rigid cage structure which is rotatable about the fixed blades 11 and is driven from the ship propulsion engine through transmission gear 9. For the purpose of explanation, the space defined by the totality of blades 12 when rotating is schematically shown in FIG. 1 by dot-and-dash lines and denoted by 12a.

It is preferable to also have the blades 12 extend in skewed relation to the axis of rotation so that they have a helical shape of relatively steep pitch, for example 20°, but in a sense opposed to the helical pitch of the fixed blades 11. The helical pitch of the blades in FIG. 1 is shown exaggerated for better illustration; but, if desired, the fixed and movable blades may also be given a large pitch angle, such as the one apparent from FIG. 1 for blades 12, it being only essential that each rotatable blade 12, during operation, can enter into a type of scissors relation to the fixed blades 11 so that the point of closest proximity between each blade 12 and the blades 11 will progressively travel along the stationary blades, and that each movable blade when ultimately passing out of proximity relative to one of the fixed blades has already reached a point of proximity with respect to the next adjacent fixed blade. As a result, the propeller device runs smoothly without shocks, thus operating with a better degree of uniformity than otherwise obtainable.

While the showing of the blades 11 and 12 in FIG. 1 is essentially schematic, particularly with respect to their transverse cross section, the actual cross-sectional shape is apparent from FIG. 2 and will be described presently.

The cross section of each rotatable blade 12 has a leading portion 12a relative to the direction of rotation denoted in FIG. 2 by an arrow E, and a trailing portion 12b which forms an integral structure with the leading portion 12a. The leading portion 12a extends substantially along a circle about the axis of propeller rotation. The trailing portion 12b deviates angularly from the leading portion of the just mentioned circle in an outward direction relative to the axis of rotation.

As a result, the rotating cage of blades 12 has a sucking effect upon the water entering the inlet duct 4 in the direction of the arrow A and forces the inducted water outwardly between the stationary blades 11 and the rotating blades 12 into the ambient body of water as is indicated by a group of arrows B. The ejection of water takes place along the entire, elongated periphery of the propeller unit so that a forceful impelling action is obtained, causing the water to pass into the duct 4 at relatively great pressure and great speed, and to emerge around and along the periphery at low speed and low pressure.

This action is due to the fact that the blades 12, by virtue of the above-described cross-sectional shape and arrangement relative to the axis of rotation, act as airfoils or aquaplanes. This will be more readily understood if one compares the leading portion 12a with an airfoil and the trailing portion 12b with a flap which forms a continuation of the airfoil and forces the flow of fluid in a direction depending upon the sense of angular deviation of the trailing or flap portion 12b relative to the leading portion 12a, this being similar to the action of an airplane wing when the wing flap is lowered.

The second propeller unit mounted between the fixed structures 1 and 3 comprises a disc or ring structure 13 rigidly attached to the fixed center structure 1 by a hub portion corresponding to hub 6. Rotatably mounted on this hub portion is a ring structure 14 which is firmly and coaxially joined with another spur gear 15 driven from the propulsion engine of the vessel in a sense of rotation opposed to that of spur gear 9. Another ring 16 is journalled on a ring-shaped portion 17 of the fixed structure 3, preferably by means of anti-friction bearings. Mounted between the fixed members 13 and 17 are stationary blades 21 of crescent-shaped cross section. Another group of blades 22 is mounted between the two rotatable rings 14 and 16 so as to form, in totality, a cage structure rotatable about the group of fixed blades 21.

Figure 3:
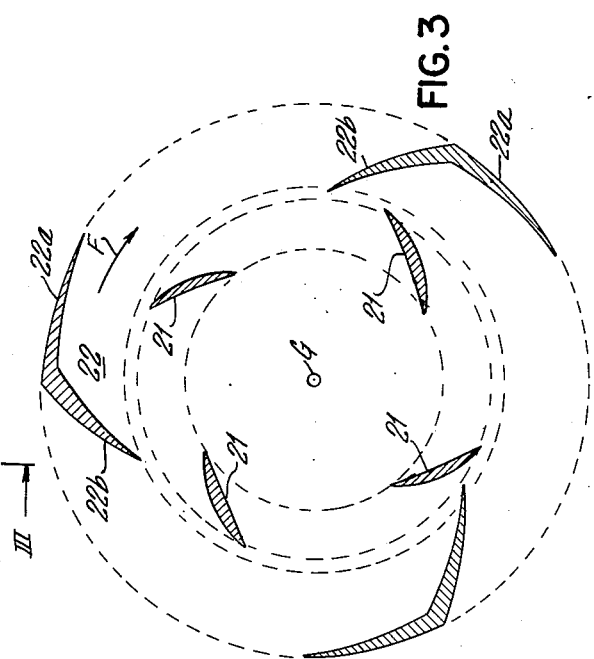
FIG. 3 shows schematically the shape and arrangement of the blade members in a radial cross-sectional plane along the line III—III in FIG. 1.

As shown in FIG. 3, each blade 22, rotating in the direction indicated by an arrow F, has a cross section whose leading portion 22a extends substantially in concentric relation to the axis of rotation, whereas the trailing portion 22b of the cross section deviates from the coaxial circle in the inward direction. The action is again comparable to that of an airfoil with a lowered flap integral therewith. As a result of that action water is inducted about and along the entire peripheral area of the second propeller unit as is indicated by a group of arrows C in FIG. 1, and the inducted water is ejected through the outlet conduit 5 is schematically shown by an arrow D.

The two propeller units thus cooperate in driving the vessel forward, the water entering into conduit 4 being ejected into the ambient body of water, and ambient water being inducted by the second unit and ejected through the outlet conduit 5. Due to the fact that the two propeller units rotate in mutually opposed directions, the resulting torques counterbalance each other with respect to the hull of the vessel.

It will be understood that, while the cages of fixed blades in the two individual propeller units according to FIG. 1 are shown to be differently designed and mounted, both units may be given the same design and mounting of these blades.

The number of stationary blades may differ from the number of removable blades as is the case according to FIG. 2, or both groups may comprise an equal number of blades as is the case according to FIG. 3. The number of blades is preferably not lower than three (FIG. 3), but may be made higher provided the remaining openings along the periphery remain sufficiently large for the desired purpose.

The missile illustrated in FIG. 4 comprises a housing 21 whose front end forms an inlet duct 24. The rear end forms an outlet duct 25 which may carry stabilizer fins as illustrated. The two ducts 24, 25 are coaxial and serve the same purposes as those denoted by 4 and 5 in FIG. 1, except that the flow of air entering the duct 24 passes through the first propulsion unit into the space 22 of housing 21 whence it is drawn inwardly by the second propulsion unit and ejected from the outlet conduit 25.

The housing carries at least one pair of coaxially aligned pivot shafts 26 rigidly joined with a central tube member 27 located on the longitudinal axis of the missile. Preferably two pairs of shafts 26 are provided at a right angle to each other in order to secure a sufficiently rigid connection of the housing wall with the tubular member 21. Rigidly mounted on member 21 is a conical and coaxial housing 28 which encloses the power source comprising, for example, a dry combustible fuel charge which when burning causes a turbine-type drive 28a to rotate the driven member 29. Member 29 is rigidly joined with a gear member 30 rotatably seated on the tubular member 27. Gear member 30 carries a group of peripherally distributed propeller blades 31 which, for simplicity, are represented mainly by the annular cylindrical space defined by the totality of blades during rotation.

Figure 10:
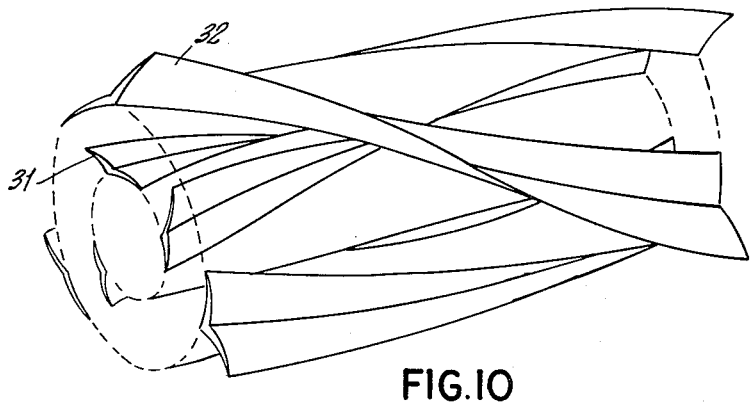
FIG. 10 is a schematic and perspective diagram showing the helical shape of two opposingly rotatable blade groups such as those according to FIGS. 2, 5 or 6.

The rotatable group of blades 31 is surrounded by another rotatable group of blades 32. Two ring members 33 and 34 are journalled in the front portion of the housing 21 preferably by means of anti-friction bearings as illustrated. The inner blades 31 have their front ends firmly attached to ring 33, and the corresponding ends of the outer blades 32 are attached to the ring 34. It will be understood that the individual blades are preferably given helical shape as explained above, the sense of pitch of the outer blades being opposed to that of the inner blades as schematically shown in FIG. 10.

The outer blades 32 (FIG. 4) are joined with a disc member 35 rotatably seated on the central tube member 27. A pair of pinions 36, journalled on respective shafts that are rigidly joined with the tube 27, transmit rotating motion from member 30 to member 35 so that these two members with the two groups or cage structures of blades rotate in mutually opposed directions. As a result, an approximate torque balance is obtained within the individual propeller unit.

The rotation of member 35 is transmitted by means of two or more pinions 37 upon a coaxial disc member 38 which is likewise rotatably mounted on tube 27. The two or more pinions 37 are journalled on the above-mentioned shafts 26.

The rotary motion of member 38 is transmitted by pinions 39 to a member 40 likewise rotatably seated on tube 27. The pinions 39 are journalled on respective shafts rigidly connected with tube 27. A set of inner blades is attached to the member 40, and a set of outer blades 42 is attached to the member 38. During operation, the two groups of blades rotate in mutually opposed directions. The respective other ends of blades 41 and 42 are attached to rings 43 and 44 rotatably journalled in housing 21 near the outlet duct 25.

The frontal propeller unit operates to induct air through conduit 24 as schematically indicated by arrows A. The air passes into the housing space 22 as shown by arrows B, and thence into the rear portion of the housing where the air is forced inwardly by the second propeller unit to ultimately pass through the outlet duct 25 as is schematically indicated by arrows C and D.

Figure 5:
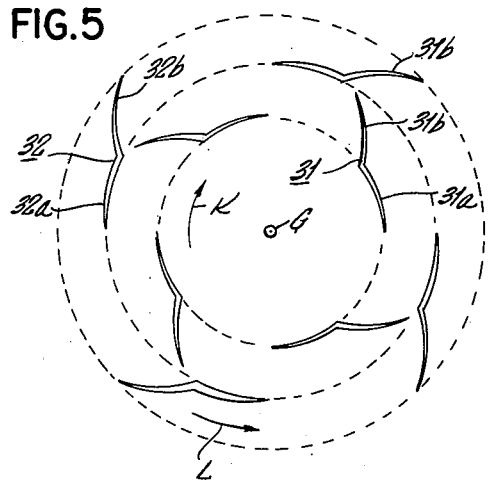
FIG. 5 is a diagram schematically indicating the shape and arrangement of the propeller blades in a horizontal plane indicated at V—V in FIG. 4.

Each inner blade 31 of the forward propeller unit has a cross section which comprises a leading portion 31a and a trailing portion 31b as schematically shown in FIG. 5 where the direction of rotation of the inner group of blades is denoted by an arrow K and the opposed rotating direction of the outer blades by an arrow L. The leading portion 31a of each inner blade extends concentrically to the axis G of rotation, whereas the trailing portion 31b curves outwardly corresponding essentially to the rotatable blades 12 in FIG. 2. The outer blades 32 according to FIG. 5 have a similar cross-sectional shape, the leading portion 32a extending substantially on a coaxial circle, whereas the trailing portion 32b curves outwardly. As mentioned, the action of such a propeller unit is to axially induct fluid and to pass it into the environment through the interspaces between the blades along the entire, elongated peripheral area of the unit.

Figure 6:
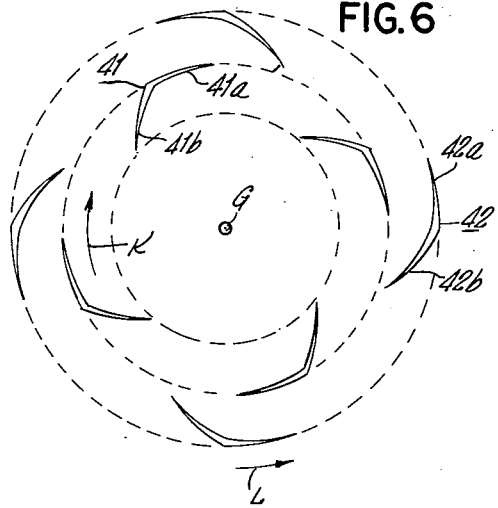
FIG. 6 is a similar diagram relating to the propeller blades in a cross-sectional, radial plane indicated at VI—VI in FIG. 4.

The cross section of the propeller blades in the rearward unit according to FIG. 4 is apparent from FIG. 6, where the directions of rotation of the inner and outer blade groups are denoted by arrows K and L respectively. The inner blades 41 have a cross section whose leading portion 41a follows substantially a circle about the axis, whereas the trailing portion 31b extends inwardly away from that circle. Similarly, each outer blade 42 has a cross section whose leading portion 42a is substantially concentric to the axis G and whose trailing portion deviates away from portion 42a in the inward direction relative to the axis G. This unit inducts air from the environment along the entire, elongated peripheral area and ejects it forcefully in the axial direction through outlet duct 25.

The twin propulsion system according to FIG. 7 has a housing 51 attached to the bottom or hull 50 of a ship. The housing 51 encloses a gear box 52 which is likewise secured to the hull and permits a free flow of water through the housing. An axial shaft member 54 is rigidly joined with the gear box 52 and carries on both ends respective deflector cones 55 and 56. The housing forms an inlet duct 57 and an outlet duct 58.

A group of fixed blades 59 is rigidly mounted between the housing wall and the frame structure 52. For simplicity, these blades are shown as extending straight and parallel to the axis of rotation. However, it is preferable to give each blade a helical shape and a sense of pitch opposed to that of the rotatable blades 60 which form an inner group. One end of each blade 60 is mounted on a ring 61 rotatable in the housing structure. The other end of each blade 60 is attached to a plate member 62 which is rotatably journalled on the fixed shaft 54 and carries a bevel gear 63. Bevel gear 63 is driven by a gear 64 on a drive shaft 65 actuated from the propulsion engine of the vessel.

The cross section of blades 60 is given a shape similar to that explained with reference to the blades 12 in FIG. 2. That is, the cross section of each blade 60 has a leading portion concentric to the axis of rotation and a trailing portion which deviates outwardly for the purpose of causing the propeller unit to induct water through conduit 57 and to eject it peripherally into the interior of the housing 51.

Another group of fixed blades 66 is rigidly mounted in the housing and surrounds an inner group of blades 67 which are mounted between a rotatable ring 68 and a member 69 rotatably seated on the fixed shaft 54 and joined with a bevel gear 70. Bevel gear 70 is driven from the same gear 64 as the bevel gear 63 but in the opposite direction. Consequently, the two groups of rotatable blades move in mutually opposed directions for reducing any undesired effects of torque. In the second propeller unit the trailing portion of each blade 67 is directed inwardly in accordance with the blades 22 described above with reference to FIG. 3.

The over-all operation of the propulsion system according to FIG. 7 is similar to that described above with reference to FIGS. 1 and 4.

Figure 8:
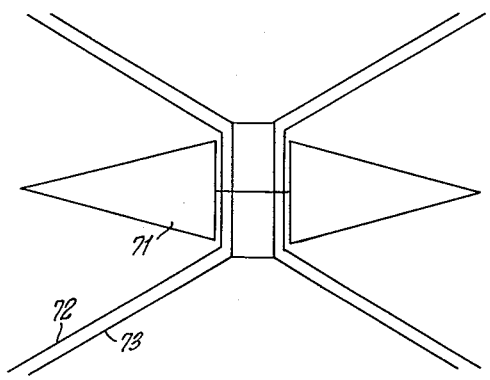
FIGS. 8 and 9 show schematically two conical propeller systems.
Figure 9:
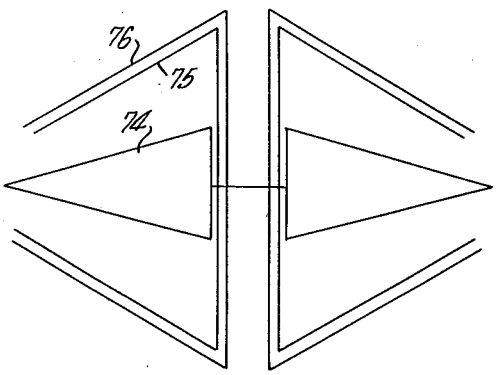

While in the embodiments so far described the two groups of blades in an individual propeller unit have substantially the shape of an elongated cylinder, the invention can also be applied to the same advantage when giving the blade groups a conical shape such as schematically shown in FIGS. 8 and 9 in somewhat exaggerated manner. In all cases, it is preferable to provide each unit with a coaxial deflector cone as indicated at 71 and 74 in FIGS. 8 and 9, corresponding to the cones denoted by 7, 28, 55, and 56 in the preceding embodiments. In FIG. 8 the inner group or cage structure of blades is denoted by 72 and the outer group by 73. In FIG. 9 the inner group is denoted by 75 and the outer group by 76. Whether a cylindrical shape or the two fundamental possibilities of conical shapes according to FIGS. 8 and 9 are preferable, depends upon the particular pressure and speed requirements with respect to the liquid being impelled. When delivery of a large quantity of fluid is desired, as is the case when using the invention for the purpose of impelling fluid, a conical shape fundamentally as shown in FIG. 8 is desirable, whereas if a high delivering pressure is mainly desired a conical shape as represented in FIG. 9 may be used.

It will be understood from the foregoing that propeller or impeller devices according to the invention operate on a principle different from that of centrifugal blowers in which the fluid is circulated and propelled outwardly by centrifugal force predominantly. In devices according to the invention, the main propelling action is due to the effect of an airfoil or aquaplane whereas centrifugal force is of less appreciable or only auxiliary significance. This is because the stationary group of blades prevents rotation of the fluid within the cylindrical or conical space defined by the blade groups; and, in the case of two opposingly rotating blade groups within one and the same unit, the respective centrifugal forces imposed upon the fluid have respective tangential components that cancel each other to a great extent.

It will be understood that a single propeller unit according to the invention, rather than a twin system, is sufficient for many purposes, such as for use as a compressor or fan. For use as fan, such unit need not be provided with an inlet or outlet duct.

On the other hand, three or more blade-group units may be combined, instead of only two, for cooperation in the manner described. Such multiple units are applicable, for example, for producing greater fluid pressure in a compressor.

Such and other modifications will be obvious to those skilled in the art upon a study of this disclosure, and it will be apparent that my invention can be embodied in devices other than those particularly illustrated and described herein, without departing from the essential features of my invention and within the scope of the claims annexed hereto.

I claim:

1. A fluid propeller apparatus comprising a pair of concentric blade groups of which one is rotatable relative to the other, one of said groups surrounding the other, each of said groups having a number of axially elongated blade members spaced from each other over the periphery of said group and extending helically about the common axis of said groups, said rotatable group forming a cage structure having an inner cage space communicating between said blades with the space around the periphery of the cage, each blade member of said rotatable group having a transverse cross section composed of a leading portion and a trailing portion integral with each other, said leading portion extending, relative to a radial plane, in substantially concentric relation to said axis, and said trailing portion deviating in said plane angularly away from said leading portion in a sense which, relative to said axis, is the same for the trailing portions of all blade members of said rotatable group.

2. A fluid propeller apparatus comprising duct means, a pair of concentric blade groups disposed coaxially adjacent to said duct means, one of said groups surrounding the other, at least one of said groups being rotatable relative to the other, each of said groups having a number of axially elongated blade members spaced from each other over the periphery of said group and extending helically about the common axis of said groups, said rotatable group forming a cage structure having an inner cage space communicating between said blades with the space around the periphery of the cage, each blade member of said rotatable group having a transverse cross section composed of a leading portion and a trailing portion integral with each other, said leading portion extending, relative to a radial plane, in substantially concentric relation to said axis, and said trailing portion deviating in said plane angularly away from said leading portion in a sense which, relative to said axis, is the same for the trailing portions of all blade members of said rotatable group, said duct means and said two blade groups forming a fluid flow path extending axially through said duct means and through said inner cage space and through the interspaces along the blades of each of said two blade groups.

3. A fluid propeller apparatus comprising duct means, a pair of concentric blade groups disposed coaxially adjacent to said duct means, one of said groups surrounding the other, each of said groups having a number of peripherally spaced blade members and forming a cage structure of axially elongated shape, one of said cage structures being rotatable relative to the other and having rotary drive means, the inner one of said cage structures having an inner cage space which forms part of said duct means and communicates through the axially elongated interspaces between the blade members of both groups with the space around the outer group, each blade member of said rotatable cage structure having over most of its length a transverse cross section composed of a leading portion and a trailing portion integral with each other, said leading portion extending, relative to a radial plane, in substantially concentric relation to said axis, and said trailing portion deviating in said plane angularly away from said leading portion in a sense which, relative to said axis, is the same for the trailing portions of all blade members of said rotatable cage structure.

4. A propeller apparatus according to claim 3, one of said two groups being stationary relative to said duct means.

5. A fluid propeller apparatus comprising duct means, a pair of concentric blade groups disposed coaxially adjacent to said duct means, one of said groups surrounding the other, each of said groups having a number of peripherally spaced blade members and forming a cage structure of axially elongated shape, one of said cage structures being rotatable relative to the other, a deflector cone mounted coaxially within the inner one of said cage structures and having its base facing away from said duct means, said cone and said inner cage structure forming together an annular interspace which communicates with said duct means and which also communicates through the interspaces between and along said blade members with the space around said outer cage structure.

6. In propeller apparatus according to claim 1, both said groups of blades being rotatable, drive means connected with said respective groups for simultaneously rotating them in mutually opposed directions, the sense of deviation of said trailing portions being the same for all blade members of both said groups.

7. In propeller apparatus according to claim 2, said rotatable blade group surrounding said other group, said trailing portions of said blades in said rotatable group deviating inwardly away from said respective leading portions, and said duct means forming the outlet of said flow path.

8. In propeller apparatus according to claim 2, said rotatable blade group surrounding said other group, said trailing portions of said blades in said rotatable group deviating outwardly away from said respective leading portions, and said duct means forming the inlet of said flow path.

9. A fluid propeller apparatus comprising an assembly of two coaxially aligned units having respective duct means located at the opposite axial ends of said assembly and forming a fluid inlet and outlet respectively, each of said two units comprising a pair of concentric blade groups coaxially adjacent to one of said respective duct means, at least one of said groups of each unit being rotatable relative to the other group, each of said groups having a number of elongated blade members spaced from each other over the periphery of said group and extending helically about the common axis of said groups, each blade member of each rotatable group having a transverse cross section composed of a leading portion and a trailing portion integral with each other, said leading portion extending, relative to a radial plane, in substantially concentric relation to said axis, and said trailing portion deviating in said plane angularly away from said leading portion, said deviation being outwardly directed relative to said axis in said one unit having said inlet duct means, but being inwardly directed in said other unit having said outlet duct means, the inner blade group in each unit forming an inner cage space which communicates with one of said duct means and which also communicates through the interspaces between and along the blade members of the unit with the space around the outer group of said unit.

10. In apparatus according to claim 9 for propulsion purposes, said two units being peripherally open toward the ambient space along the periphery and effective axial length of said respective units.

11. Apparatus according to claim 9, comprising a housing enclosing said two units and forming a communication between the respective pairs of blade groups, whereby the fluid flow passes from said inlet duct means through one of said blade groups and said housing to the other blade group and said outlet duct means.

12. In apparatus according to claim 9, one of said two blade groups of each unit being stationary, said trailing portions of the rotatable blade group deviating outwardly from said respective leading portions in the one unit having said inlet duct means but deviating inwardly in said other unit.

13. In apparatus according to claim 9, said two blade groups in each of said units being rotatable and having respective drive means for rotating them in mutually opposed directions, said trailing portions of all blades deviating outwardly in the one unit having said inlet duct means, and the trailing portions of all blades in the other unit deviating inwardly.

14. Apparatus according to claim 9, comprising a drive having transmission means located midway between said two units and connected with respective blade groups in said respective units.

References Cited in the file of this patent
UNITED STATES PATENTS

| 1,498,919 | Jensen | June 24, 1924 |
| 2,224,260 | Galliot | Dec. 10, 1940 |
| 2,318,990 | Doran | May 11, 1943 |
| 2,636,467 | Johnson | Apr. 28, 1953 |
| 2,853,227 | Beardsley | Sept. 23, 1958 |
| 2,897,761 | Roy | Aug. 4, 1959 |

FOREIGN PATENTS

| 369,079 | Germany | Feb. 14, 1923 |
| 942,850 | Germany | May 9, 1956 |